(12) United States Patent
Davis (10) Patent No.: US 10,902,731 B2
(45) Date of Patent: Jan. 26, 2021

(54) DYNAMIC ROUTE ADMINISTRATION FOR HAULING VEHICLES

(71) Applicant: TRUCK IT LLC, Woodstock, GA (US)

(72) Inventor: Pace Davis, Woodstock, GA (US)

(73) Assignee: TRUCK IT LLC, Woodstock, GA (US)

( * ) Notice: Subject to any disclaimer, the term of this patent is extended or adjusted under 35 U.S.C. 154(b) by 56 days.

(21) Appl. No.: 16/215,599

(22) Filed: Dec. 10, 2018

(65) Prior Publication Data

US 2020/0184826 A1 Jun. 11, 2020

(51) Int. Cl.
*G08G 1/00* (2006.01)
*G01C 21/34* (2006.01)

(52) U.S. Cl.
CPC .......... *G08G 1/20* (2013.01); *G01C 21/3446* (2013.01)

(58) Field of Classification Search
None
See application file for complete search history.

(56) References Cited

U.S. PATENT DOCUMENTS

| | | | | |
|---|---|---|---|---|
| 2007/0241882 A1* | 10/2007 | Panttaja | ............... | G08G 1/20 340/521 |
| 2012/0041675 A1* | 2/2012 | Juliver | ............... | G06Q 10/08 701/465 |
| 2012/0253548 A1* | 10/2012 | Davidson | ........... | G06Q 10/0631 701/1 |
| 2013/0268191 A1* | 10/2013 | Telang | ............... | G01C 21/00 701/468 |
| 2019/0130745 A1* | 5/2019 | Turato | ............... | G08G 1/123 |

* cited by examiner

*Primary Examiner* — Tamara L Weber
(74) *Attorney, Agent, or Firm* — H. Artoush Ohanian (57) ABSTRACT

A computer implemented method and system for representing the schedule and time interval of a plurality of hauling vehicles between a pick-up location and a drop-off location. The method and system incorporating mobile computing and a dynamic graphical interface to assist administrators in scheduling and administering hauling vehicles from pick-up location to drop-off location. The dynamic graphical interface capable of real-time information to hauling vehicles on the route and calculating in real-time changes in the pick-up time and drop-off time. The dynamic graphical interface also displaying the time interval between hauling vehicles for more efficient scheduling administration. The method and system capable of updating the hauling vehicle operators in real-time of the estimated time of arrival for pick-up and drop-off as well as interval time between the plurality of hauling vehicles.

12 Claims, 4 Drawing Sheets

DYNAMIC ROUTE ADMINISTRATION FOR HAULING VEHICLES

FIELD

The present invention is in the field of digital asset management and customer relationship management in the ground-based freight transport industry.

BACKGROUND

Ground based freight transport is a key driver to economies worldwide. Point to point transfer of materials encapsulates many industries from materials to bulk goods. Ground based freight has traditionally operated within the constructs of the traditional industry, wherein a paper ticket is resolved, and the freight is transported from material site to location with minimal computational systems interaction.

Transport of materials and freight transport is the physical process of transporting commodities, merchandise, cargo, and materials. Ground shipping has a place of origin and a destination, the origin location is the physical location where the freight is received. At the origin location freight is often weighted or measured as part of obtaining information for delivery and operations. The destination location is where the freight is delivered. Destination locations may also incorporate a weighment of the vehicle and or freight.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. Other technical advantages may become readily apparent to one of ordinary skill in the art after review of the following figures and description.

DETAILED DESCRIPTION OF EXAMPLE EMBODIMENTS

Figure 1:
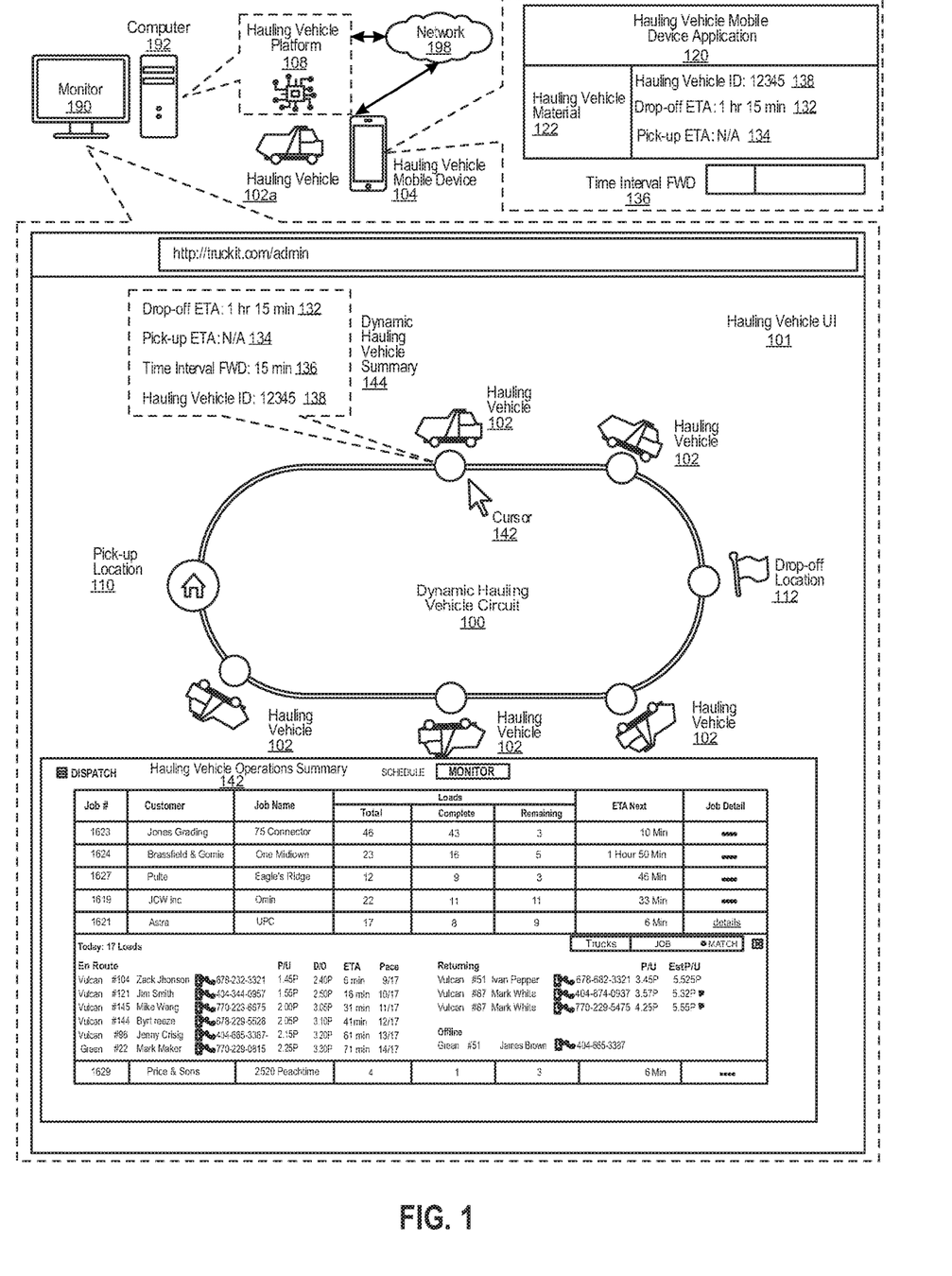
FIG. 1 sets forth a line drawing illustrating an example system for dynamic route administration for hauling vehicles according to embodiments of the present invention.

Systems and methods for dynamic route administration according to various embodiments of the present invention are described herein with reference to the accompanying drawings beginning with FIG. 1. Modifications, additions, or omissions may be made to the various embodiments described herein without departing from the scope of the disclosure. For example, the components of the systems and apparatuses may be integrated or separated. Moreover, the operations of the various embodiments disclosed herein may be performed by more, fewer, or other components and the methods described may include more, fewer, or other steps. Additionally, steps may be performed in any suitable order.

FIG. 1 sets forth a line drawing illustrating an example system for dynamic route administration for hauling vehicles according to embodiments of the present invention. Dynamic route administration operates generally to calculate estimated arrival times of one or more hauling vehicles (102a) at a pick-up location (110) and a drop-off location (112) and display a graphical icon (102) on a dynamic hauling vehicle circuit (100) representing the current relationship in time between the hauling vehicles current location on a particular route and its estimated arrival at a pick-up location or the drop-off location.

In the present embodiment of FIG. 1, the dynamic hauling vehicle circuit is displayed on a monitor to a user through a UI (101). The dynamic route administration, according to embodiments of the present invention, allows the operators the ability to administer the operations of multiple hauling vehicles in a simplified and time-oriented depiction of the UI (101). The dynamic hauling vehicle circuit further allows each of the hauling vehicles to synchronously schedule either their pick-up location (110) or their drop-off location (112) or both without being distracted by complex navigation maps or having to determine where each of the hauling vehicles are actually located on route to their destination.

Hauling vehicles according to example embodiments of the present invention are vehicles, often used in commercial endeavors such as material transportation for both commercial and residential construction sites, capable of transporting material from a pick-up material site to a drop-off site. Examples of hauling vehicles useful in embodiments of the present invention include dump trucks, pickup trucks, large semi-trailer trucks, personal vehicles capable of carrying substantial material, trailers, and other vehicles as will occur to those of skill in the art. The example hauling vehicles described above are for explanation and not for limitations. Many other types of hauling vehicles may be useful for hauling vehicle administration according to embodiments of the present invention and all such vehicles are well within the scope of the present invention.

The system of FIG. 1 includes a hauling vehicle (102a) having a driver that administers a hauling vehicle mobile device application (120) installed on a mobile device (104). The mobile device (104) and hauling vehicle mobile device application (120) of FIG. 1 is coupled for data communications with a hauling vehicle platform (108) through a network (198). Networks according to example embodiments of the present invention may include data communications in the form of Bluetooth™, Wireless cellular standards such as 1G™, 2G™, 3G™, 4G LTE™ and 5G™, or other communication protocols such as wireless LAN, wireless WAN, and SAN, as well as many others as will occur to those of skill in the art.

Mobile devices useful in embodiments of the present invention include the Apple iPhone®, Samsung Galaxy®, or other devices running, respectively, iOS®, Android®, or other operating systems as will occur to those of skill in the art. In other embodiments tablet computers may be utilized as well with note book computers that are capable of cellular network communications. Popular cellular network laptops are manufactured by Lenovo® ThinkPad, the Google® Chromebook, and others as will occur to those of skill in the art.

The hauling vehicle device application (120) installed on the mobile device (104) in the example of FIG. 1 is implemented as a module of automated computing machinery that functions with the hauling vehicle platform (108) to provide dynamic route administration according to embodiments of the present invention. Automated computing machinery, as that phrase is used in this specification, means a module, segment, or portion of code or other automated computing logic, hardware, software, firmware, and other logic, as well as the combination of any of the aforementioned, as will occur to those of skill in the art—both local and remote. Automated computing machinery is often implemented as executable instructions, physical units, or other computing logic for implementing the specified logical function(s) as will occur to those of skill in the art. As mentioned, such automated computing machinery implement logical units both local and remote and as such, often implement data communications across buses, networks, wired and wireless as will occur to those of skill in the art and all such data communications are well within the scope of the present invention.

As mentioned above, the system of FIG. 1 includes a hauling vehicle platform (108). The hauling vehicle platform (108) of FIG. 1 is a module of automated computing machinery configured for dynamic route administration according to embodiments of the present invention. The hauling vehicle platform (108) of FIG. 1 operates by receiving, from a plurality of hauling vehicles (102a), through a plurality of hauling vehicle mobile device applications (120) installed on a plurality of mobile devices (104) associated with each hauling vehicle (102a), the location and identity (138) of each of the plurality of hauling vehicles (102a). The hauling vehicle mobile device applications of FIG. 1 support data communications with the hauling vehicle platform (108) to provide, for example, the current location of the hauling vehicle, the pick-up site, the drop-off site, the current speed of the hauling vehicle, the current route of the hauling vehicle, weather conditions of the vehicle, average speed of the vehicle, traffic conations and may other attributes associated with the transportation of the hauling vehicle as will occur to those of skill in the art.

The hauling vehicle platform (108) of FIG. 1 operates for hauling vehicle administration by calculating, in dependence upon a plurality of travel routes of the plurality of hauling vehicles and one or more attributes of the hauling vehicle, estimated arrival times of each of the hauling vehicles at the pick-up location and estimated drop-off times at the drop-off location. The hauling vehicle platform dynamically updates the time of arrival at the pick-up location and drop-off location by maintaining communications with the plurality of hauling vehicles (102) utilizing hauling vehicle mobile devices (104) with the hauling vehicle mobile device application (120). The hauling vehicle mobile device application (120) transmitting continuous coordinates of the equipped hauling vehicle (102).

A pick-up site as is used in this specification is a location operated to dispense material transported by the hauling vehicle. Examples of material pick-up sites according to embodiments of the present invention include quarries, material sales sites, lumber yards, timber pick-up locations, construction sites, shipping docks, transmitting ports, and others as will occur to those of skill in the art. Examples of material typically picked up at material pick-up sites according to embodiments of the present invention include gravel, asphalt, lime, stone, sand, bush, wood, timber, and other consumer and construction goods as will occur to those of skill in the art.

A drop-off site as is used in this specification is a location for receiving the material transported by the hauling vehicle. Examples of drop-off sites according to embodiments of the present invention include construction sites, landfills, infrastructure rebuilding and repair sites, project sites, short-term sites such as disaster recovery sites, loading bays, festivals and many others as will occur to those of skill in the art.

To acquire the route to be traveled, the hauling vehicle platform (108) of FIG. 1 communicates with a navigation server typically implemented as a module of automated computing machinery that provides navigation information for route-based applications as will occur to those of skill in the art. Example navigation servers useful according to embodiments of the present invention include Google® Maps, Apple® Maps, MapBox®, and other navigation servers that are configured to transmit accurate estimates of time, location, and navigational routes. Navigation servers typically expose an application programming interface ('API') allowing hauling vehicle platforms according to embodiments of the present invention to acquire routes for travel for a plurality of hauling vehicles.

Navigation servers according to embodiments of the present invention often utilizes a multi-graph to represent a road network. A multi-graph consists of nodes and edges. The intersections in a road network, for example, form the nodes of a multi-graph and the road segments between those intersections in a road network form the edges of the multi-graph useful in navigation according to embodiments of the present invention. More particularly, for example, if N denotes the finite, non-empty set of nodes, with |N|=n the total number of nodes and E denotes the finite, non-empty set of directed edges between the pair of nodes, then an edge e from node u to node v, can be defined as $\delta 1$ e=u and $\delta 2$ e=v. As such a route p in the multi-graph G=(N, E) is then sequence of edges p={$e_1, \ldots, e_l$}, with $e_i \in E$, and $\delta 2 (_i) = \delta 1 (e_i+1)$, for i=1, . . . , l−1. This mathematical operation is provided for explanation, and not for limitation. In fact, route-based navigation utilizes many algorithms and such algorithms are useful according to embodiments of the present invention.

The hauling vehicle platform (108) of FIG. 1 also operates for hauling vehicle administration by calculating, in dependence upon the plurality of pre-determined travel routes of the plurality of hauling vehicles and their one or more attributes and its current location, estimated time intervals (136) between the plurality of hauling vehicles between the pick-up location (110) and the drop-off location (110) and displaying in dependence upon the calculated time intervals to a pick-up location and a drop-off location a graphical icon representation of the hauling vehicle (102) on the dynamic hauling vehicle circuit (100) presented through the hauling vehicle user interface ('UI') (101).

More particularly, the hauling vehicle platform (108) of FIG. 1 provides through a monitor (190) a UI (101) of for hauling vehicle dynamic route administration according to embodiments of the present invention. The example UI (101) of FIG. 1 provides a depiction of a dynamic hauling vehicle circuit (100) provided by the hauling vehicle platform (108). The dynamic hauling vehicle circuit (100) of FIG. 1 is a graphical representation of a time-oriented representation and abstraction of a hauling vehicle's transportation from a pick-up location to a drop-off location. The dynamic hauling vehicle circuit (100) is useful to visually represent to an operator the estimated times of arrival as they travel from a pick-up location (110) to a drop-off location (112) and vice versa. The dynamic hauling vehicle circuit (100) is updated by the hauling vehicle platform in real-time. Real-time is defined as happening in quick succession as the acts occur as to deliver relevant and timely information to the modules.

In the example of FIG. 1, each representation of a particular hauling vehicle (102) on the dynamic hauling vehicle circuit (100) is implemented itself as UI widget capable of providing additional content information about the particular hauling vehicle (102) and its route provided by the hauling vehicle platform (108). Such a UI widget may be clicked upon with a cursor (142) or other selection device to dynamically display attribute data of the selected hauling vehicle in the form of a dynamic hauling vehicle summary (144) through the UI. When the UI widget is selected, the hauling vehicle platform (108) displays the dynamic hauling vehicle summary (144) which includes attributes such as the drop-off estimated time of arrival (132), the pick-up estimated time of arrival (134), the time interval forward (136), and the hauling vehicle identification (138). To provide real-time information in the dynamic hauling vehicle summary (144), the hauling vehicle platform (108) is dynamically updated with the plurality of hauling vehicle attributes from the hauling vehicle mobile devices (104) executing the hauling vehicle mobile device application (120) that is then transmitted to the hauling vehicle platform (108).

Additional attributes associated with each hauling vehicle may also be provided through the hauling vehicle UI (101) such as a job number, customer ID, customer name, job name, hauling vehicle material, hauling vehicle operator contact information, quantity of the hauled load, number of loads complete, number of loads remaining, and other relevant attributes.

In the example embodiment of FIG. 1, a hauling vehicle operations summary (142) provides an overview operational summary for the hauling vehicle platform (108). The hauling vehicle operations summary (142) includes hauling parameters for the hauling vehicles (102), and provides real-time updates to the plurality of hauling vehicles (102) on the hauling vehicle routes. In the example embodiment the job # indicates the job that has been assigned to the hauling vehicles in the job database. The customer is stored as information regarding the purchaser of hauling materials. The job name is an operator described job name for the hauling job stored in the job database. The loads classifier indicates the total loads to be hauled, the completed loads, and the remaining loads. The ETA next tab indicates the next expected estimated time of arrival for the next hauling vehicle (102) to the drop-off location (112). The job detail tab includes a repository for job notes and additional job specifications.

The hauling vehicle operations summary (142) provides a listing of in-route hauling vehicles (102) that are in-route, returning, or offline. The hauling vehicle operations summary (142) includes the hauling vehicle identification, the hauling vehicle operator, the hauling vehicle operators contact information, the estimated time to pick-up location (110), the estimated time to drop-off location (132), and the time interval forward (136).

The dynamic hauling vehicle circuit (108) of FIG. 1 is updated by the hauling vehicle platform (108) to update the hauling vehicle attributes in real-time on the hauling vehicle platform display in accordance with the received information from the hauling vehicle mobile device application (120). The displayed hauling vehicles (102) so updated on the dynamic hauling vehicle circuit (100) will move position-to-position along the route in accordance with the actual position the hauling vehicle is traveling relative to its time of arrival.

In the example embodiment of FIG. 1, the representation of the hauling vehicles' (102) progress toward either the representation of the pick-up location (110) or the representation of the drop-off location (112), as depicted on the dynamic hauling vehicle circuit (100). The progression of the representation of hauling vehicles (102) on the dynamic hauling vehicle circuit (100) is a direct response from the hauling vehicle platform (108) updating through communications with the hauling vehicle mobile device application (120) the current location of the hauling vehicle on its particular route to either the pick-up location or the drop-off location. Intermittence in communications from the hauling vehicle mobile device application (120) to the hauling vehicle platform (108) may be handled by storing the last remaining position of the hauling vehicle and calculating the time interval and the estimated time of arrival from the last known position.

Figure 2:
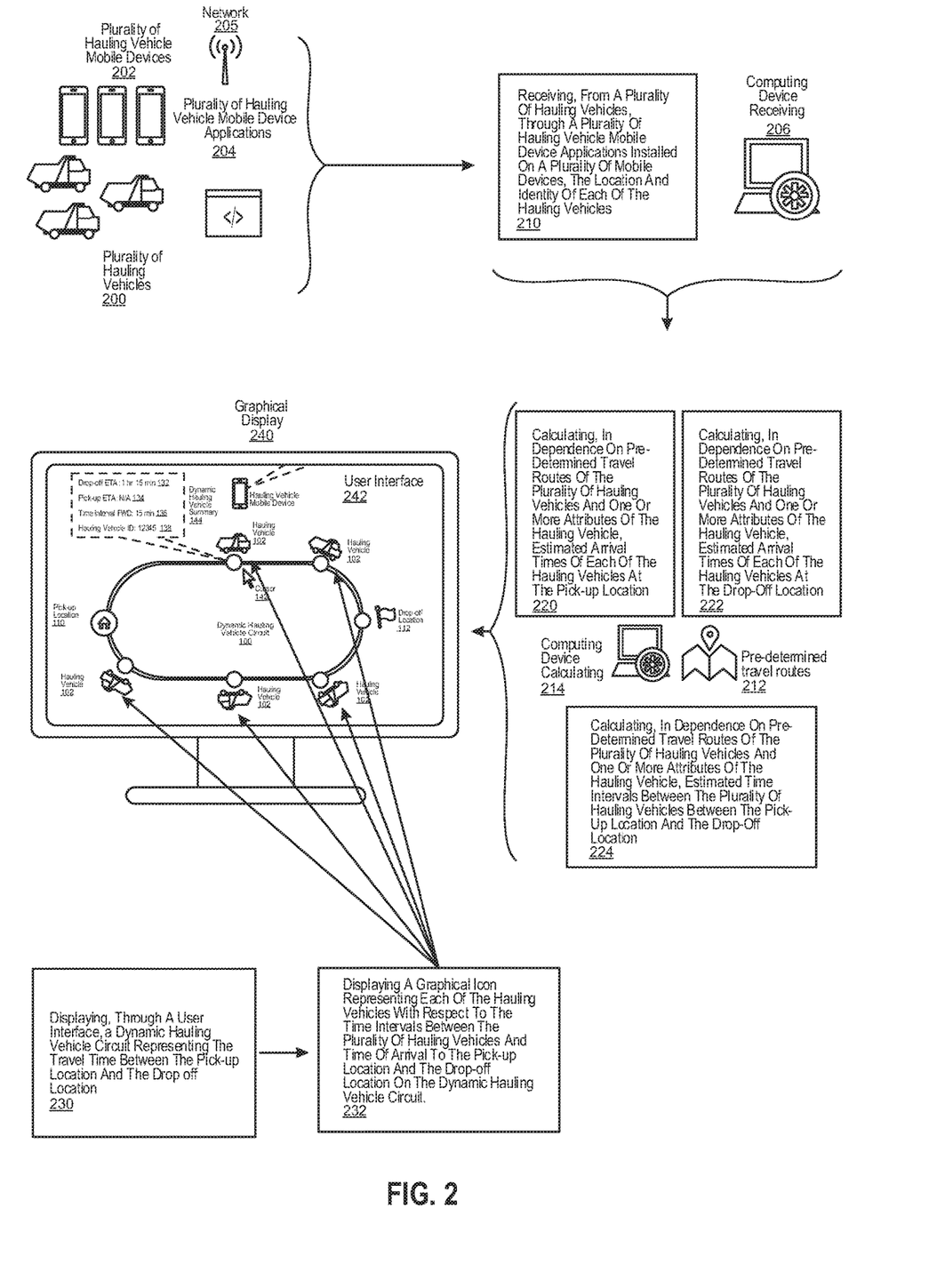
FIG. 2 sets forth a line diagram of an example method for hauling vehicle dynamic route administration according to embodiments of the present invention.

For further explanation, FIG. 2 sets forth a flow chart illustrating an example a method for hauling vehicle dynamic route administration according to embodiments of the present invention. The method of FIG. 2 includes receiving (210), from a plurality of hauling vehicles (102), through a plurality of hauling vehicle mobile device applications (202) installed on a plurality of mobile devices (200) associated with each hauling vehicle (102), the location and identity of each of the plurality of hauling vehicles (200). Receiving (210), from a plurality of hauling vehicles, through a plurality of hauling vehicle mobile applications installed on a plurality of hauling vehicle mobile devices associated with each hauling vehicle, the location and identity of the plurality of hauling vehicles may be carried out by caching the location and identity of a hauling vehicles in the event of intermittence data communications to the hauling vehicle.

Receiving (210), from a plurality of hauling vehicles (200), through a plurality of hauling vehicle mobile applications (204) installed on a plurality of mobile devices (202) associated with each hauling vehicle, the location and identity of the plurality of hauling vehicles. The location received by transmission from the plurality of hauling vehicle mobile devices communicating over a network (205) at least the location and identity of the hauling vehicle. The receiving application (210) also equipped to receive information from the plurality of hauling vehicle mobile devices the specific hauling vehicle identification number of each of the hauling vehicles.

Receiving (210), from a plurality of hauling vehicles, through a plurality of hauling vehicle mobile applications, installed on a plurality of mobile devices associated with each hauling vehicle, the location and identity of the plurality of hauling vehicles including the hauling current weather information.

Receiving (210), from a plurality of hauling vehicles, through a plurality of hauling vehicle mobile applications installed on a plurality of mobile devices associated with each hauling vehicle, the location and identity of the plurality of hauling vehicles including the customer name of the hauling job.

Receiving (210), from a plurality of hauling vehicles, through a plurality of hauling vehicle mobile applications installed on a plurality of mobile devices associated with each hauling vehicle, the location and identity of the plurality of hauling vehicles including the job name of the of hauling job.

The method of FIG. 2 includes calculating (220), in dependence upon a plurality of pre-determined travel routes of the plurality of hauling vehicles and one or more attributes of the hauling vehicle, estimated arrival times of each of the hauling vehicles at the pick-up location.

The method of FIG. 2 also includes calculating (222), in dependence upon a plurality of pre-determined travel routes of the plurality of hauling vehicles one or more attributes of the hauling vehicle estimated drop-off times at the drop-off location.

The method of FIG. 2 also includes calculating, in dependence upon a plurality of pre-determined travel routes of the plurality of hauling vehicles and one or more attributes of the hauling vehicle, estimated time intervals between the plurality of hauling vehicles between the pick-up location and the drop-off location;

Calculating, in dependence on a plurality of pre-determined travel routes of the plurality of hauling vehicles, estimated arrival times of each of the hauling vehicles at the pick-up location and estimated return times at the drop-off location, estimated time intervals between the plurality of hauling vehicles maybe be carried out by determining additional stop-off locations for the plurality of hauling vehicles.

Calculating, in dependence on a plurality of pre-determined travel routes of the plurality of hauling vehicles, estimated arrival times of each of the hauling vehicles at the pick-up location and estimated return times at the drop-off location, estimated time intervals between the plurality of hauling vehicles may be carried out by transmitting a message to at least one of the plurality of hauling vehicles mobile device of the time of arrival to the pick-up location or the drop-off location.

The method of FIG. 2 also includes displaying, in dependence upon a plurality of pre-determined travel routes of the plurality of hauling vehicles and one or more attributes of the hauling vehicle, through a user interface, in dependence upon the calculated time intervals and time of arrival of each of the hauling vehicles, a dynamic hauling vehicle circuit representing the travel time between the pick-up location and the drop-off location; and The method of FIG. 2 also includes calculating, for each hauling vehicle, an estimated current location on the dynamic hauling vehicle circuit. The method of FIG. 2 also includes displaying a graphical icon representing each of the of hauling vehicles on the dynamic hauling vehicle circuit.

The method of FIG. 2 includes executing the hauling vehicle mobile device application (204) on a hauling vehicle mobile device (104). Each hauling vehicle (102) is equipped with a hauling vehicle mobile device (104). The hauling vehicle mobile device accounts for the vehicle position and identification by executing the hauling vehicle mobile device application (204). The hauling vehicle mobile devices then transmits the hauling vehicle information and position to the hauling vehicle platform (108).

In further explanation of FIG. 2, the hauling vehicle (102) is equipped with a hauling vehicle mobile device (104), in which the hauling vehicle mobile device (104) executes the hauling vehicle mobile device application (204). The hauling vehicle mobile device in the example embodiment is a smart phone such as an Apple iPhone® or Samsung Galaxy® running, respectively, either the iOS® or Android® operating system. In other embodiments tablet computers may be utilized as well with note book computers that are capable of cellular network communications. Popular cellular network laptops are manufactured by Lenovo® ThinkPad and the Google® Chromebook.

In example embodiment of FIG. 2, the computing device receives (210) from the hauling vehicle mobile device running the mobile device application the hauling vehicle identification and the hauling vehicle position. The hauling vehicle platform is configured to receive simultaneously and in real-time, updates from each of the operational hauling vehicles. The hauling vehicle platform stores the received information for processing in real-time with the hauling vehicle platform (108) and then displays the information on the UI in the form of a dynamic hauling vehicle circuit and a hauling vehicle operations summary.

In the example embodiment of FIG. 2, the receiver is equipped for data communications and is further coupled with the computing device executing the hauling vehicle platform. Receivers include communications adapters for data communications with other computers as well as for data communications with a data communications network. Such data communications may be carried out serially through RS-232 connections, through external buses such as a Universal Serial Bus ('USB'), through data communications data communications networks such as IP data communications networks, and in other ways as will occur to those of skill in the art. Receivers and communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Referring to FIG. 2, the computing device is equipped to calculate, in dependence on a plurality of pre-determined travel routes (212), the estimated time of arrival at the pick-up and drop-off locations. As described previously, the computing device calculates the estimated time of arrival for the pick-up location and the drop-off location from a plurality of parameters utilizing the hauling vehicle platform (108). The hauling vehicle platform (108) resides within the hauling vehicle platform and receives information on each of the current operation hauling vehicles including at least each operation hauling vehicles position as well as identification.

The hauling vehicle platform (108) is then configured with a navigation server and with the position and identification it calculates the relative position of each operational hauling vehicle. Once the position of each operational hauling vehicle is calculated along a hauling vehicle route, the hauling vehicle platform (108) is then configured to display and update in real-time the current active positions of each hauling vehicle on the dynamic hauling vehicle circuit. Each hauling vehicle on the dynamic hauling vehicle circuit is capable of a cursor click to bring to the foreground additional details in a dynamic hauling vehicle summary. Additionally, the hauling vehicle platform (108) updates the hauling vehicle operations summary with the estimated time of arrival at the pick-up location and the drop-off location along with the estimated intervals between operational hauling vehicles.

The computing device (214) in the example embodiment is the same computing device in (206) and operates as a cloud computing network, additional computing devices are embodied in the present disclosure such as local area network computer devices as well as stand-alone computing devices. For instance, in another embodiment, the computing device receiving (206) may be a server on a network. The server computing device may then may transmit the received information of the hauling vehicle position and the hauling vehicle identification to a computing device at a remote site, such as a corporate office, wherein the computing device then calculates through the hauling vehicle platform (108) hauling vehicle platform (108) the estimated time of arrival for the plurality of the hauling vehicles at the pick-up location (110) and the drop-off location (112).

The estimated times of arrival at the pick-up and drop-off locations are estimates calculated from the hauling vehicle position embodied in the GPS within the hauling vehicle mobile device (104). Intermittence in GPS signal is understood and well known, the hauling vehicle mobile device (104) executing the hauling vehicle mobile device application (204) continues to transmit the signal and will continue to check for connectivity issues and resend in the observance of any intermittency of signal. The hauling vehicle platform (108) is equipped to handle such intermittency and will update the plurality of hauling vehicles (102) when network connection is restored. In one example embodiment last known positions and time of arrivals for the hauling vehicles will remain stored within the hauling vehicle platform (108). In alternative embodiments the last known position and time of arrivals will continue to advance as calculated by the estimated time of arrival at the pick-up location (110) or the drop-off location (112), along with the estimated time interval.

In the example embodiment of the method for hauling vehicle administration in FIG. 2, displaying in the present embodiment includes projecting on a UI within the hauling vehicle platform (108) a dynamic hauling vehicle circuit (100). The dynamic hauling vehicle circuit (100) maintains the active hauling vehicles (102) on the hauling vehicle route in a graphical representation. The active hauling vehicles (102) each having characteristics and attributes regarding the specific hauling vehicle (102).

The dynamic hauling vehicle circuit (100) is displayed representing the travel time between the pick-up location and the drop-off location. In the example embodiment the display projects a graphical icon representing each of the plurality of hauling vehicles (102) with respect to time interval between the plurality of hauling vehicles (102) and the time of arrival to the pick-up location (110) and the drop-off location (112) on the dynamic hauling vehicle circuit (100).

Figure 3:
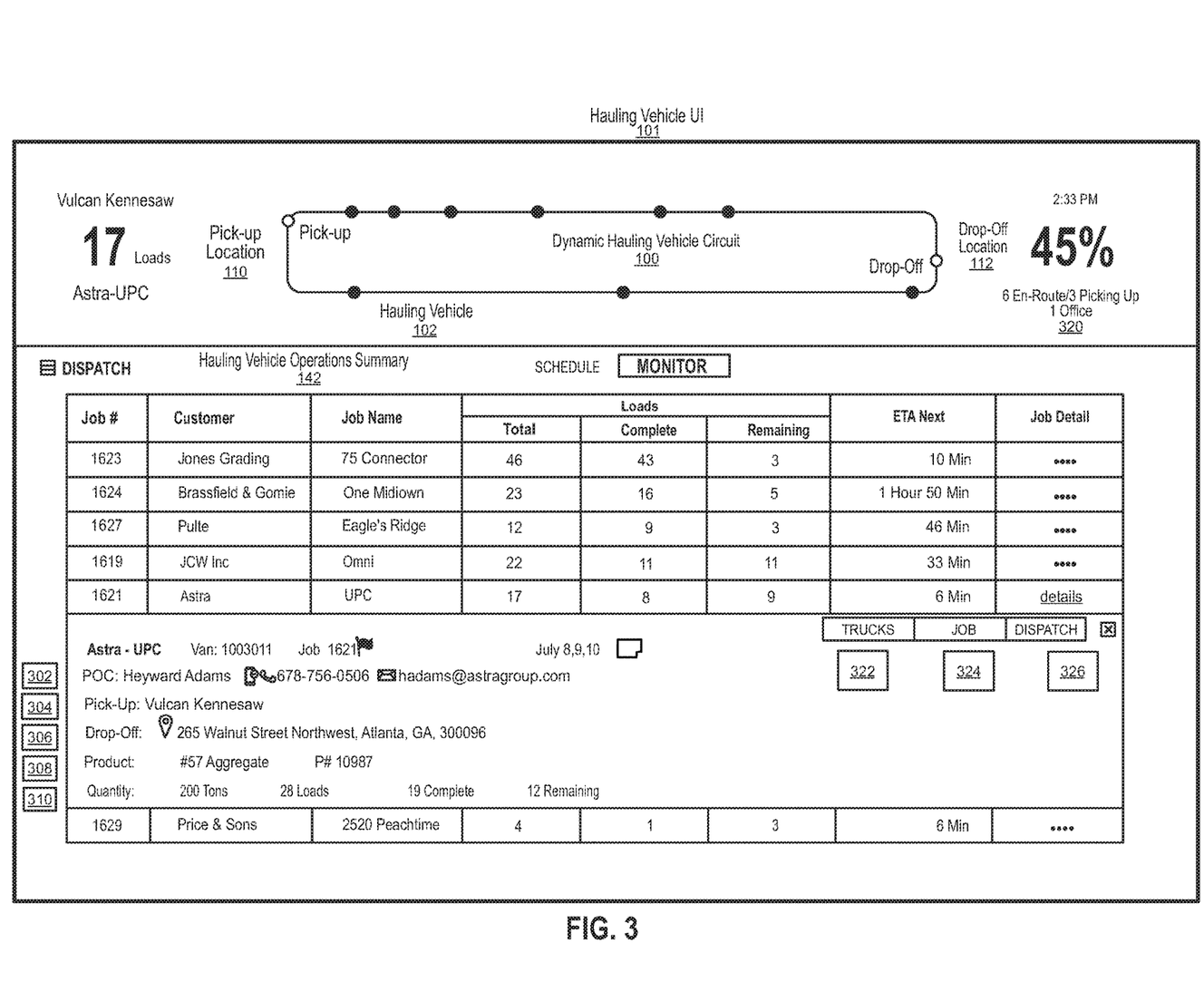
FIG. 3 is a model user interface ('UI') diagram illustrating an example interface for the hauling vehicle dynamic route administration according to embodiments of the present invention.

For further explanation, FIG. 3 sets forth a model UI diagram illustrating an example of the interface for the hauling vehicle dynamic route administration according to embodiments of the present invention. The hauling vehicle platform (108) is disclosed with a dynamic hauling vehicle circuit (100) including the pick-up location (110) and the drop-off location (112). The dynamic hauling vehicle circuit (100) has exemplary hauling vehicles (102) identified as points on the dynamic hauling vehicle circuit (108).

In the example embodiment of FIG. 3, the summary of in-route, picking up, and offline hauling vehicles (320) is available for instantaneous update and capture from the plurality of hauling vehicles equipped with hauling vehicle mobile devices that are executing the hauling vehicle mobile device application (120). The hauling vehicle operations summary (142) includes hauling parameters for the hauling vehicles (102) and provides real-time updates to the plurality of hauling vehicles on the stored routes. In the example embodiment the job # indicates the job that has been assigned to the hauling vehicles in the job database. The customer is stored as information regarding the purchaser of hauling materials. The job name is an operator described job name for the hauling job stored in the job database. The loads classifier indicates the total loads to be hauled, the completed loads, and the remaining loads. The ETA next tab indicates the next expected estimated time of arrival for the next hauling vehicle (102) to the drop-off location (112). The job detail tab includes a repository for job notes and additional job specifications.

The hauling vehicle platform (108) of FIG. 3 contains a hauling vehicle summary (142). The hauling vehicle summary contains a point of contact ('POC') (302) for the selected hauling vehicle operator. The hauling vehicle summary (142) further contains the pick-up location (304), the drop-off location (306), the product being hauled (308), and the quantity being hauled (310), along with information regarding how many loads have been completed.

Figure 4:
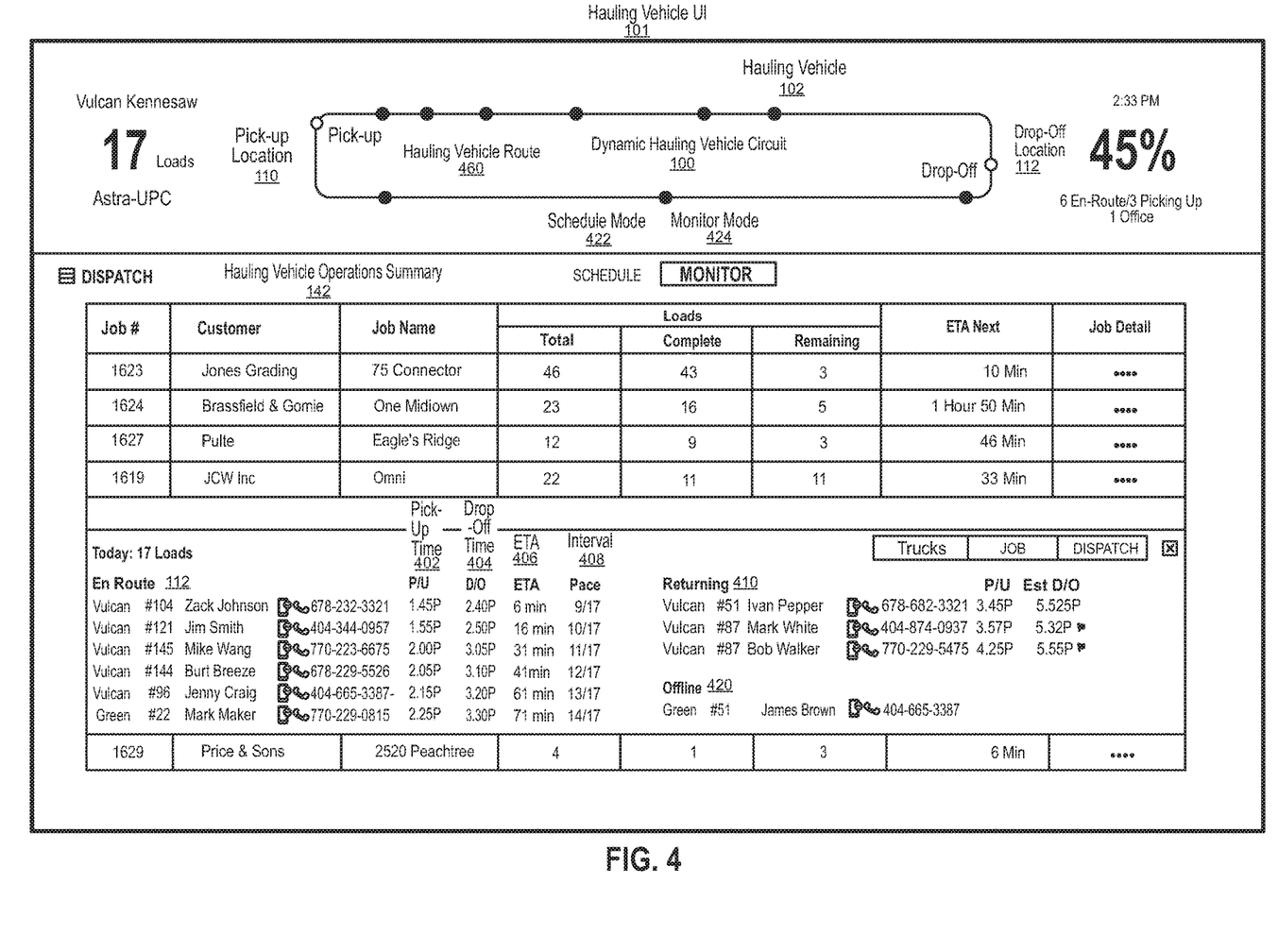
FIG. 4 is model UI diagram illustrating an example interface for the hauling vehicle dynamic route administration according to embodiments of the present invention.

For further explanation, FIG. 4 sets forth an example UI diagram is presented illustrating another view of an interface for hauling vehicle dynamic route administration according to embodiments of the present invention. In the example of FIG. 4, Referring to the example embodiment in FIG. 4, the hauling vehicle operations summary (142) has a schedule mode (422) and a monitor mode (424). The schedule mode (422) allows for hauling operations to configure hauling vehicle routes for the hauling vehicle circuit. The predefined routes can be changed in real-time by the hauling vehicle operator and may re-address the hauling vehicles in the field to the new location. The present embodiment additionally allows for operators to change parameters such as job #, customer, job name, and job detail while in schedule mode. Further, the schedule mode allows scheduling of the material type, the loads of material to be transferred and parameters regarding requirements for the hauling vehicles.

In the monitor mode (424) the hauling vehicle operator can visualize the contents of the in-route (400) hauling vehicles, the in-route vehicles pick-up time (402) at the material site or pick-up location, the in-route vehicles drop-off time (404) at the drop-off location, the estimated time of arrival (406) to the drop-off location, and the current interval (408) of the hauling vehicle on the hauling vehicle route.

The monitor mode also contains the returning hauling vehicle information for hauling vehicles returning to the pick-up location, as well as the hauling vehicle contact information and estimated drop-off time at the drop-off location (112).

In monitor mode, the operator is also displayed the offline hauling vehicles along with the hauling vehicle identification and hauling vehicle contact number. The hauling vehicle platform (108) contains additional configurable modes to assist in hauling vehicle operations. For example, offline mode may also contain a last contact position so as to identify if the hauling vehicle has experienced any issues with equipment and or platform issues.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer implemented method for dynamic route administration for hauling vehicles, the method comprising:
receiving, from a plurality of hauling vehicles, through a plurality of hauling vehicle mobile device applications installed on a plurality of mobile devices associated with each hauling vehicle, the location and identity of each of the plurality of hauling vehicles;

calculating, in dependence upon a plurality of pre-determined travel routes of the plurality of hauling vehicles and one or more attributes of each of the hauling vehicles, for a first subset of the plurality of hauling vehicles en route a pick-up location, estimated arrival times of each of the first subset of the hauling vehicles at the pick-up location and estimated time intervals between adjacent hauling vehicles of the first subset, and for a second subset of the plurality of hauling vehicles en route a drop-off location, estimated arrival times of each of the second subset of the hauling vehicles at the-drop-off location and estimated time intervals between adjacent hauling vehicles of the second subset;

displaying on a user interface a dynamic hauling vehicle circuit having a first portion representing the travel time for transit from the pick-up location to the drop off location and a second portion representing the travel time for transit from the drop-off location to the pick-up location; and calculating, for each hauling vehicle, an estimated current location on the dynamic hauling vehicle circuit; and displaying a plurality of graphical icon representing each of the of hauling vehicles on the dynamic hauling vehicle circuit located proportionally with respect to the first and second portions of the circuit in accordance with transit time.

2. The method of claim 1 further comprising:

caching the location and identity of a hauling vehicle in the event of intermittence intermittent data communications with the hauling vehicle; and calculating the estimated current location on the dynamic hauling vehicle circuit for the hauling vehicle from the cached location.

3. The method of claim 1, wherein receiving, from a plurality of hauling vehicles, through a plurality of hauling vehicle mobile applications, installed on a plurality of mobile devices associated with each hauling vehicle, the location and identity of the plurality of hauling vehicles includes receiving the hauling vehicle driver identification.

4. The method of claim 1, wherein receiving, from a plurality of hauling vehicles, through a plurality of hauling vehicle mobile applications, installed on a plurality of mobile devices associated with each hauling vehicle, the location and identity of the plurality of hauling vehicles includes receiving the hauling current weather information.

5. The method of claim 1, wherein receiving, from a plurality of hauling vehicles, through a plurality of hauling vehicle mobile applications installed on a plurality of mobile devices associated with each hauling vehicle, the location and identity of the plurality of hauling vehicles includes receiving the customer name of the hauling job.

6. The method of claim 1, wherein receiving, from a plurality of hauling vehicles, through a plurality of hauling vehicle mobile applications installed on a plurality of mobile devices associated with each hauling vehicle, the location and identity of the plurality of hauling vehicles includes receiving the job name of the of hauling job.

7. The method of claim 1 further comprising:

determining additional stop-off locations for one or more of the plurality of hauling vehicles.

8. The method of claim 1 further comprising:

transmitting a message to at least one of the plurality of mobile devices an arrival time for the pick-up location or the drop-off location.

9. A system for dynamic route administration for hauling vehicles, the system comprising:

a receiver, the receiver equipped to receive data communications from a plurality of hauling vehicle mobile applications, the hauling vehicle mobile applications being installed on a plurality of mobile devices, each mobile device being associated with each hauling vehicle, the data communications include at least the location and identity of the plurality of hauling vehicles; and a computing device, the computing device equipped to the receiver to receive data communications from the plurality of hauling vehicle mobile applications;

the computing device being equipped to a database, wherein one or more routes of travel between a pick-up location and a drop-off location is stored;

the computing device being configured to calculate the routes of travel of the plurality of hauling vehicles in dependence upon the data communications received from the plurality of hauling vehicle mobile applications and the stored routes of travel in the database;

the computing device being configured to calculate, in dependence on the stored travel routes of the plurality of hauling vehicles, and in dependence upon the data communications received from the plurality of hauling vehicle mobile applications, the time intervals between each of the hauling vehicles en route the pick-up location, the time of arrival of each of the hauling vehicles en route the pick-up location at the pick-up location, the time intervals between each of the hauling vehicles en route the drop-off location, and the time of arrival of each of the hauling vehicles en route the drop-off location at the drop-off location; and the computing device being configured to generate a display including the calculated time intervals and times of arrival of each of the plurality of hauling vehicles, the display further including a dynamic hauling vehicle circuit having a first portion representing the travel time for transit from between the pick-up location and to the drop off location and a second portion representing the travel time for transit from the drop-off location to the pick-up location and a plurality of a graphical icons superimposed thereon, each graphical icon representing one of the of plurality of hauling vehicles and located proportionally with respect to the first and second portions of the circuit in accordance with transit time.

10. The system of claim 9, wherein the one or more routes of travel between a pick-up location and a drop-off location further include one or more additional stop-off locations.

11. The system of claim 9, wherein the computing device is further configured with data communications to transmit the time intervals between each of the hauling vehicles to the hauling vehicles mobile device applications running on the hauling vehicles mobile devices.

12. The system of claim 9, wherein the computing device is further configured with data communications to transmit the time of arrival of each of the hauling vehicles at the pick-up location or drop-off location to each of the hauling vehicles mobile device applications running on the hauling vehicles mobile devices.

* * * * *